United States Patent Office 2,811,517
Patented Oct. 29, 1957

2,811,517

IODO-DEXTRAN AND METHODS FOR PRODUCING THE SAME

Leo J. Novak, Dayton, Ohio, assignor to The Commonwealth Engineering Company of Ohio, Dayton, Ohio, a corporation of Ohio No Drawing. Application September 21, 1955,
Serial No. 535,729

11 Claims. (Cl. 260—209)

This invention relates to dextran-iodine compounds and to methods of producing them.

As is well known, iodine has certain undesirable properties. It often exhibits an irritating effect on the skin and delicate tissues, and is toxic if taken internally. These properties have limited both the internal and external use of iodine in its free and combined form, since the use of iodine in a quantity sufficient for it to exert its curative properties frequently results in serious damage to the skin or to body organs.

Various attempts have been made to prevent or inhibit the development of serious damage resulting from the caustic, irritating and toxic effects of iodine. Thus, it has been proposed to use iodine in the form of mixtures thereof with organic and inorganic adjuvants or of compounds of iodine with organic and inorganic bases. However, for the most part, the known chemical compounds and physical mixtures have the drawback of also being toxic or of comprising the iodine only in small or ineffective amounts. There has been, also, the problem of controlling the composition of the chemical compounds in those instances, involving chemical reaction of the iodine with another substance.

One object of this invention is to provide new chemical compounds containing iodine which are non-irritating and the M. L. D. and L. D.$_{50}$ of which can be controlled.

Another object is to provide a series of new chemical entities of varying controllable iodine content.

A further object is to provide water-soluble iodine-containing compounds.

These and other objects are accomplished by the present invention which provides dextran-iodine compounds combining dextran with iodine whereby the iodine is substituted for one or more hydroxyl groups of the dextran.

The dextran reacted with the iodine may be native high molecular weight microbiologically produced dextran, such as that biosynthesized from sucrose by the action of microorganisms of the *Leuconostoc mesenteroides* and *L. dextranicum* types or their enzymes. Or it may be a partial hydrolyzate of the native dextran. In general, the dextran may have a molecular weight between 2000 and that of the native, microbiologically produced material, and be water-soluble or water-insoluble.

The dextran-iodine compound may be prepared by dissolving or dispersing the dextran in water, adding powdered crystalline U. S. P. iodine or Lugol's solution, and heating the mixture at 50–80° C., stirring being continued, until the iodine has combined with the dextran. The reaction mass comprises a solution of the iodo-dextran. The solution may be used as such after dilution with water, or the water may be removed and the iodo-compound recovered in particulate condition.

Alternatively, the dextran may be dispersed in an organic solvent which is a chlorine acceptor, such as pyridine, and containing a sulfonic acid chloride which reacts with the dextran, the solvent may be removed by distillation, the residue dissolved in alcohol, the solution neutralized, an alkali metal iodide added, and the mass heated to 100–120° for three to five hours or until the dextran iodide is formed. On working up the crude reaction product, the crystalline iodi-dextran is recovered.

There is thus obtained a water-soluble dextran-iodine compound of predetermined and controlled iodine content, the dextran portion of which serves as a carrier and control for the iodine as well as stabilizing aqueous solutions of the iodine.

Thus, a native microbiologically produced high molecular weight dextran in which more than one hydroxyl is replaced by iodine may be selected for external application, either in solution or relatively dilute dispersion, or as a paste. For internal use, an iodo-derivative of a water-soluble dextran of molecular weight in the "clinical" dextran range, i. e., one having a molecular weight of 20,000 to 200,000 (average 60,000 to 80,000) and such as is suitable for intravenous injection may be preferred.

The iodine compound selected may have a higher or lower iodine content as may be indicated for a particular curative or disinfectant effect depending on the molar ratio of dextran to iodine or iodide, which may be from 1:3 to 1:15. Aqueous solutions of these iodine-substituted dextrans may also be applied externally and may be used as X-ray contrast media which cause the structure of the kidney to become visible under X-ray observation. The products are non-irritating, stable, and may be used for any of the purposes for which iodine is adapted.

The following examples are illustrative of specific embodiments of the invention, it being understood that these examples are not limitative.

Example I

About 25 parts of dry particulate purified native (unhydrolyzed) water-soluble dextran are dissolved in 500 parts of distilled water at room temperature. To the resulting solution are added ten parts of Lugol's solution (5% iodine, 10% potassium iodide) with stirring. The mixture is allowed to stand for about 12 hours or until the desired dextran iodide is formed. The latter is precipitated by methanol, the precipitate is recovered and dissolved in water, and the dextran iodide is re-precipitated with methanol. The water-soluble dextran iodide occurs as a powder.

Example II

A dispersion of 300 grams of particulate "clinical" dextran in 2500 cc. of pyridine is prepared and cooled to −5° C. About 325 grams of p-toluene sulfonyl chloride are added in small increments over a period of about a half-hour and with continued stirring. The solution is let stand for about a half-hour, after which the major portion of the free pyridine is distilled off under vacuum. The residue is dissolved in 500 cc. of alcohol, 500 cc. of water are added, and the solution is neutralized with a 20% sodium hydroxide solution using bromthymol blue as indicator. The solvent is taken off under vacuum, the residue is mixed with six liters of acetone, refrigerated for about 12 hours and then filtered to remove the insolubles. The acetone solution is concentrated to about 1.2 liters and 200 grams of sodium iodide are dissolved in it, the solution being then heated to about 100° C. for about four hours. After it is cooled, the reaction mass is filtered, the solvent taken off the filtrate under vacuum, and the residue dissolved in 700 cc. of water. The aqueous solution is extracted twice with methylene dichloride, brought to neutral with aqueous sodium hydroxide, and the water is distilled off under vacuum, leaving the dextran iodide as residue.

In this example, the iodo-dextran is obtained from the intermediate p-toluenesulfonyl derivative. Instead of using p-toluene sulfonyl chloride, the acid chlorides of other sulfonic acids, such as ethane-sulfonic, methanesulfonic or benzenesulfonic acids may be used in equivalent amounts.

Any other inert organic solvent chlorine acceptor may be used for dispersing the dextran, instead of pyridine.

*Example III*

Example II is repeated using dextran having an average molecular weight of 5000.

*Example IV*

Example II is repeated using dextran of average molecular weight about 500,000 and ethane sulfonyl chloride.

Since variations and changes may be made in carrying out the invention without departing from its spirit and scope, it is to be understood that the invention is not intended to be limited except as defined in the appended claims.

What is claimed is:
1. As a new compound, iodo-dextran.
2. The method of making iodi-dextran comprising the steps of adding iodine to an aqueous solution of dextran and holding the solution until the iodo-dextran is formed therein.
3. The method according to claim 2, characterized in that the iodine is added to the dextran solution as a 5% solution thereof in 10% potassium iodide.
4. The method according to claim 2, characterized in that the iodine is added to an aqueous solution of native, unhydrolyzed water-soluble dextran.
5. The method according to claim 2, characterized in that the iodine is added to an aqueous solution of clinical dextran.
6. The method of making iodo-dextran comprising the steps of dispersing dextran in a solution of a sulfonic acid chloride in an organic solvent that is a chlorine acceptor, removing a major portion of said solvent, dissolving the residue in alcohol, diluting the solution with water, neutralizing the solution, removing the alcohol under vacuum, adding acetone to the residue, adding an alkali metal iodide to the acetone solution, heating the solution to 100–120° C. for three to five hours, and recovering the iodo-dextran therefrom.
7. The method according to claim 6, characterized in that the organic solvent chlorine acceptor is pyridine.
8. The method according to claim 6, characterized in that the sulfonic acid chloride is p-toluenesulfonyl chloride.
9. The method according to claim 6, characterized in that native unhydrolyzed dextran is dispersed in the organic solvent.
10. The method according to claim 6, characterized in that clinical dextran is dispersed in the organic solvent.
11. The method of making iodo-dextran which comprises dissolving dextran in water, adding iodine to the solution as a 5% solution thereof in 10% potassium iodide, holding the mass until the iodo-dextran is formed, precipitating the same from the solution by the addition of methanol, and separating the precipitate.

References Cited in the file of this patent

UNITED STATES PATENTS

| | | |
|---|---|---|
| 2,365,776 | Raymond et al. | Dec. 26, 1944 |
| 2,448,510 | Barham | Sept. 7, 1948 |
| 2,562,882 | Barham | Aug. 7, 1951 |
| 2,677,645 | Allen | May 4, 1954 |